United States Patent [19]
Sygnator

[11] 3,812,639
[45] May 28, 1974

[54] LOCKING AND STRIP-RESISTANT FASTENER

[75] Inventor: Henry Anton Sygnator, Arlington Heights, Ohio

[73] Assignee: Illinois Tool Works, Chicago, Ill.

[22] Filed: Mar. 26, 1973

[21] Appl. No.: 345,024

[52] U.S. Cl. .................... 52/758 F, 151/22, 85/46
[51] Int. Cl. ............................................ F16b 5/02
[58] Field of Search .......... 151/22, 19 A; 85/46, 41; 52/758 F, 714, 758 D

[56] References Cited
UNITED STATES PATENTS

| 2,346,835 | 4/1944 | Green | 151/22 |
|---|---|---|---|
| 2,352,540 | 6/1944 | Hanneman | 151/22 |
| 2,360,826 | 10/1944 | Cherry | 151/22 |
| 3,452,375 | 7/1969 | Gabbey | 151/22 |
| 3,687,501 | 8/1972 | Wilson | 52/758 F |

FOREIGN PATENTS OR APPLICATIONS

| 231,222 | 11/1960 | Australia | 85/46 |
|---|---|---|---|
| 480,449 | 8/1929 | Germany | 85/46 |

*Primary Examiner*—Marion Parsons, Jr.
*Attorney, Agent, or Firm*—Robert W. Beart; Thomas W. Buckman

[57] ABSTRACT

A threaded fastener device provided with a locking section extending from the threaded shank portion to the clamping face of the driving head. The locking section is generally noncircular in cross section and is eccentric to the axis of the fastener providing peripheral surfaces of varying radial distance from the axis of the shank and upon which a partial thread convolution is formed which has a crest diameter greater than the crest diameter of the threaded shank portion.

7 Claims, 5 Drawing Figures

PATENTED MAY 28 1974 3,812,639

LOCKING AND STRIP-RESISTANT FASTENER

The present invention is directed to a threaded fastener which is particularly adapted for use with metallic sheet workpieces. Heretofore one of the major problems in providing a threaded fastening joint in sheet workpieces is the tendency of a threaded fastener to strip from the internal threads formed in apertures in sheet workpieces. Thus, the torque levels of application in such environment have been extremely critical.

In addition to the tendency of screws to strip from sheet workpieces, tight joints have been difficult to maintain due to the tendency of the fastener to loosen itself from the workpiece as a result of vibrations or the like.

It is, therefore, an object of this invention to provide a threaded fastener which increases the strip torque capability in a sheet metal joint through the use of a locking section beneath the clamping surface of the fastener.

It is a further object of the invention to provide a threaded fastener which includes a locking section to be used in conjunction with an extruding entering portion to increase the strip resistance of a sheet metal threaded fastening joint.

These and other objects and advantages are provided by this invention which includes a fastener having a threaded shank portion that includes a locking section at the upper extremity thereof which is directly adjacent and connected to the clamping surface of the driving head. The locking section may be generally described as having a noncircular cross section and which is eccentric to the axis of the fastener. This configuration provides a radially enlarged peripheral work engaging surface which is of varying radial distance from the axis of the fastener at any given axial distance from the work clamping surface. A continuation of the thread convolution is formed on the radially enlarged peripheral work engaging surface of the locking section and this partial thread is configured to have a crest diameter which is greater than the crest diameter of the remaining threads on the threaded shank portion.

As will be pointed out later in the specification, this novel configuration provides a surface which works or swages an aperture in at least the upper workpiece to significantly increase the frictional force between the threads of the fastener and the mating surfaces of the aperture. This increase in frictional force thus serves to decrease the tendency of the fastener to strip from the workpiece as a result of excessive torque.

Other objects and features of the invention will become apparent from the following description and accompanying drawings wherein FIG. 1 is a partial elevational view showing an unthreaded blank utilized in the production of the locking screw of the invention.

Figure 1:
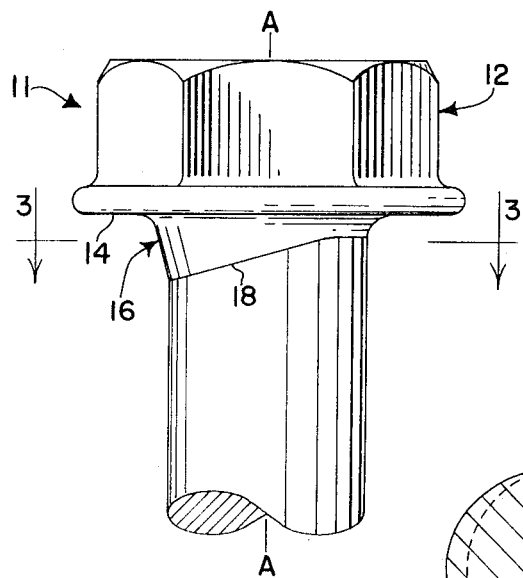
Figure 2:
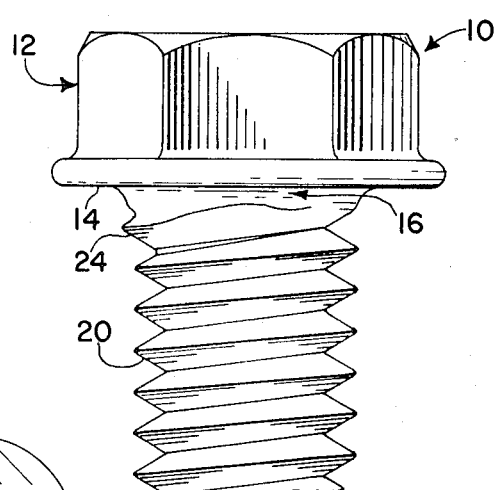
FIG. 2 is a partial elevational view showing a screw incorporating the locking features of the present invention.
Figure 4:
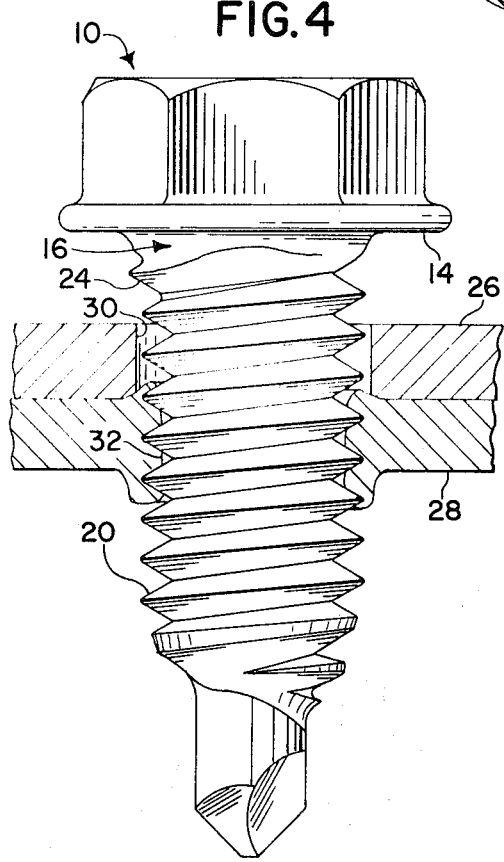
FIG. 4 is a sectional side view showing the locking screw associated with a pair of superimposed workpieces.
Figure 5:
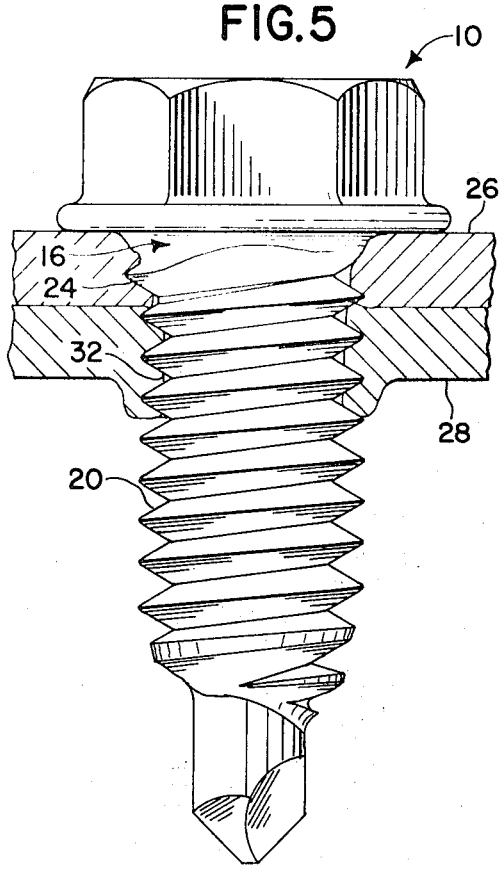
FIG. 5 is a sectional side view similar to FIG. 4 showing the screw lockingly engaging the superimposed work panels.

Referring now more specifically to the drawings wherein like parts are designated by the use of the same numerals throughout the various figures, a screw 10 incorporating the features of the present invention is shown in FIGS. 2, 4 and 5. The screw 10 is formed from a blank 11 shown in FIG. 1 which will be described fully below.

The finished screw 10 comprises an elongated shank portion 20, having thread convolutions rolled or formed thereon. The trailing end of the shank portion is provided with a locking portion 16, which will be described more fully below. The screw is preferably provided with an enlarged head 12 having suitable surfaces to accommodate a rotary driving tool. The head 12 further includes a clamping surface 14 on the underside thereof. The locking portion 16 thus joins the threaded shank 20 to the clamping face 14.

Figure 3:
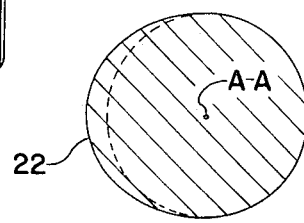
FIG. 3 is a sectional view taken on the plane indicated by lines 3—3 in FIG. 1, showing the configuration of the locking section of the screw.

The blank 11, from which the locking and strip-resistant fastener 10 is formed, includes a generally conical locking section 16 interposed between the shank portion and the clamping face 14 of the enlarged head 12. The shank portion is shown to be concentric with the enlarged head portion in a conventional manner. However, the locking portion presents a cross-sectional configuration which is eccentric to the axis of the fastener. As illustrated in the sectional view of this locking portion 16 in FIG. 3, a peripheral segment 22 of the locking section is generally of a greater radial distance from the axis A—A than the other peripheral segments of the locking section at a given axial distance from the work clamping surface. The locking portion 16 can best be described as a frustoconical section formed on the trailing end of the shank which has been laterally displaced from the axis A—A of the shank. The lateral displacement of a frustoconical section results in a portion which blends with the shank and forms a junction line 18 inclined to a plane taken perpendicularly of the axis of the fastener. When the blank is formed by cold heading techniques the locking section is formed having a radially enlarged segment 22 and a remaining segment blending with the shank at juncture line 18.

Referring again to FIG. 2, the locking section 16 of the fastener is shown to include a partial thread 24 formed thereon. This partial thread 24 is a continuation of the convolutions 20 and, due to the larger volume of material present in the peripheral segment 22, the crest of the partial thread 24 is greater than the crest of the thread convolutions 20. The maximum radial dimension from the axis of the screw to the crest of partial thread 24 is thus greater than the maximum radial dimension of the thread convolutions 20. Also, as a result of the increased volume in the locking section, this partial thread can be shown to have a variable pitch as compared to the pitch of the thread convolutions 20.

In FIG. 4 the fastener 10 is disclosed in initial association with sheets or workpieces 26 and 28. Workpiece 26 has been provided with a clearance aperture 30 while workpiece 28 is shown to have an aperture 32 which has been swaged or worked to provide extrusions on its upper and lower surfaces. The preparation of the aperture 32 can advantageously be accomplished through the use of a fastener including a work swaging feature as described in U.S. Pat. application Ser. No. 177,950. Such a work swaging feature is shown adjacent the entering extremity of the fastener in FIGS. 4 and 5. As the threaded shank portion 20 is further rotated in the apertures 32 and 30, the locking section 16 is brought into contact with the aperture 30. The enlarged peripheral segment 22 first contacts the aperture 30 with partial thread 24. Continued rotation of the locking section within the aperture 30 works or swages the aperture 30 and tends to extrude or form the aperture similar to the aperture 32. However, the clamping face 14 and lower workpiece 28 effectively constrains the deformation of the aperture 30 in the axial direction of the fastener and the forces of swaging are confined to react in a radial direction of the aperture 30. This radial reaction of the swaging forces provides a substantially increased frictional contact between the surfaces of the locking section 16 and the inner periphery of the aperture 30. Since the locking section flares outwardly, this frictional contact increases as the clamping face 14 approaches the upper surface of the work panel 26.

As a result of the material working properties of the locking section 16, it has been observed that the frictional contact between the previously deformed aperture 32 and the fastener is increased. The swaging forces applied to the aperture 30 in part may be directed downwardly so that the lower edge of aperture 30 forcefully impinges at least the upper extension of the lower workpiece 28.

The eccentric configuration of the locking section creates forces on the fastener tending to cock the shank in the apertures, thus creating additional locking or prevailing torque conditions in the joint.

Thus the present invention provides a threaded fastener which exhibits high locking and strip resistant characteristics and which is particularly effective for use with superimposed sheet workpieces.

While the invention has been described in conjunction with a specific embodiment, it is evident that many alternatives, modifications and variations will be apparent to those skilled in the art in light of the foregoing description. Accordingly, it is intended to embrace all such alternatives, modifications and variations as fall within the spirit and broad scope of the appended claims.

I claim:

1. A locking and strip-resistant fastener having a threaded shank portion, a driving head including a work clamping undersurface, a locking portion extending upwardly and outwardly of the threaded shank joining the threaded shank to the clamping surface, the locking portion being noncircular in cross section and eccentric with the axis of the fastener, the cross-sectional configuration of the locking portion providing one peripheral segment, at a given axial distance from the work clamping surface, of greater radial distance from the axis of the shank than another peripheral segment at the same axial distance, the thread convolutions of the threaded shank portion extending onto the locking portion and providing at least a partial thread convolution on said one peripheral segment having a crest diameter greater than the crest diameter of the remainder of the threads.

2. A locking and strip-resistant fastener in accordance with claim 1, wherein the peripheral surface of the locking portion increases in radial distance from the axis of the fastener in an axial direction from the threaded shank to the work clamping surface.

3. A locking and strip-resistant fastener in accordance with claim 1, wherein the work clamping surface is generally planer.

4. A locking and strip-resistant fastener in accordance with claim 1, wherein the locking portion blends with the threaded shank portion forming a juncture line disposed at an angle to a plane extending perpendicular to the axis of the shank.

5. A locking and strip-resistant fastener in accordance with claim 1, wherein a segment of the peripheral surface of the locking portion projects axially downwardly of the remainder of the peripheral surface.

6. A locking and strip-resistant fastener in accordance with claim 1, wherein the locking portion provides a work engaging peripheral surface having a minimum radial distance from the axis of the screw which is at least equal to the distance between the root of the threads formed on the shank and the axis of the screw.

7. A threaded fastener in combination with a pair of superimposed workpieces, the fastener having a threaded shank, an entering portion with means to swage an aperture in the lowermost workpiece providing an extrusion on the upper surface as well as on the lower surface on said lowermost workpiece, the trailing end of the fastener including a driving head with a work clamping surface on the underside thereof, a generally conical section joining the threaded shank portion to the work clamping surface, said generally conical locking section having a noncircular cross section configured to be eccentric to the axis of the fastener providing means to lockingly engage an aperture in the uppermost workpiece, the thread convolutions of the threaded shank extending onto the locking section to provide a partial thread with a crest diameter greater than the crest diameter of the remaining threads, wherein the locking section increases the frictional contact of the fastener with the aperture in the lowermost workpiece as well as creating increased frictional contact between the fastener and the aperture in the upper workpiece thus enhancing the ability of the fastener to resist stripping relative to the workpieces.

* * * * *